Figure 4:
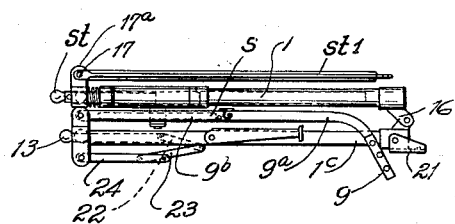

Dec. 3, 1940.  H. REICHERT  2,224,087
FOLDABLE STRETCHER
Filed June 25, 1938  2 Sheets-Sheet 1
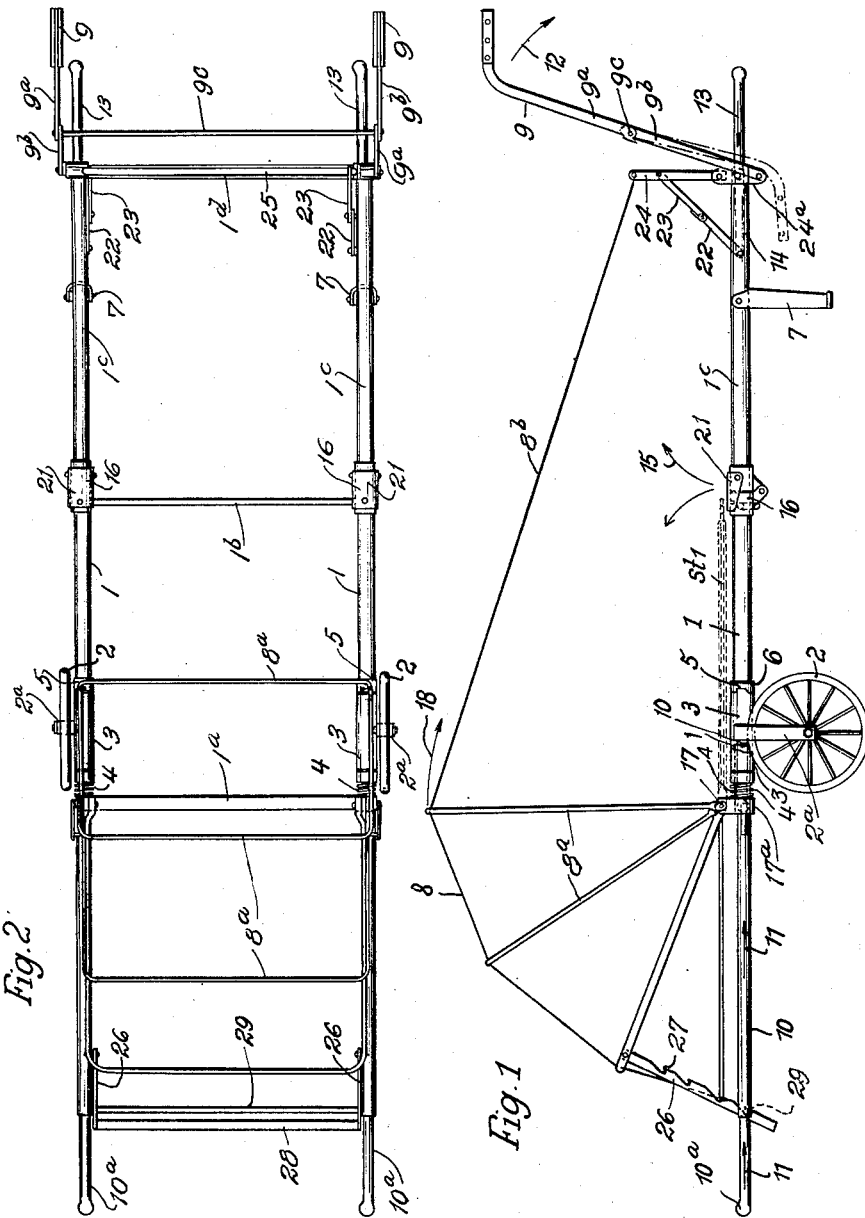
inventor:
Hans Reichert,
by Kimmel & Crowell,
Attorneys, Dec. 3, 1940.   H. REICHERT   2,224,087
FOLDABLE STRETCHER
Filed June 25, 1938   2 Sheets-Sheet 2

Inventor:
Hans Reichert,
by Kimmel & Crowell,
Attorneys.

Patented Dec. 3, 1940

2,224,087

UNITED STATES PATENT OFFICE 2,224,087

FOLDABLE STRETCHER

Hans Reichert, Berlin, Germany

Application June 25, 1938, Serial No. 215,912
In Germany April 8, 1938

1 Claim. (Cl. 5—82)

This invention relates to a foldable and extendible stretcher.

The primary object of this invention resides in the provision of a stretcher especially adapted for transporting ill and injured individuals from place to place and having a collapsible hood, telescopic side members, telescopic hand grips, foldable traction wheels, foldable supports, and foldable handles, and with the foregoing elements being so related to enable the stretcher to be folded in a compact manner to occupy a small storage space when not desired for use.

A further object of the invention resides in the provision of a foldable and extendible stretcher including an intermediate wheeled frame, a rear frame hinged to the intermediate frame, and a frame disposed in telescopic relation with the intermediate frame.

A further object of the invention is to provide, in a manner as hereinafter set forth, a foldable and extendible stretcher including intermediate, rear and front frames, and a hood for disposing over the front frame and pivoted to the intermediate frame, and an extensible cover connected to and extending rearwardly from the hood and coupled with the rear frame.

A further object of the invention resides in the provision of a portable, foldable and extendible stretcher for public use, which is capable of being folded in a compact manner to a size whereby it is possible of being stored in a part of the known hollow columns erected in streets and the like which are equipped with apparatus for communication with police offices, assistance stations, and the like in order to call for help in case of an accident to an individual.

Further objects of the invention are to provide, in a manner as hereinafter set forth, a stretcher for the purpose referred to which is comparatively simple in its construction and arrangement, strong, durable, foldable compactly to occupy a small space for storage, expeditiously extended when desired for use, readily portable, thoroughly efficient when used for the purpose intended thereby, and comparatively inexpensive to manufacture.

Embodying the aforesaid objects and others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

Figure 3:
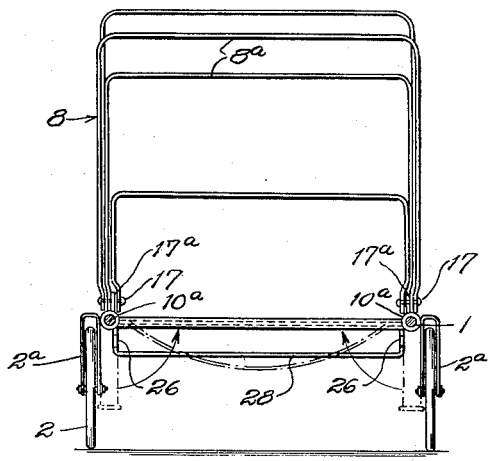
Figure 5:
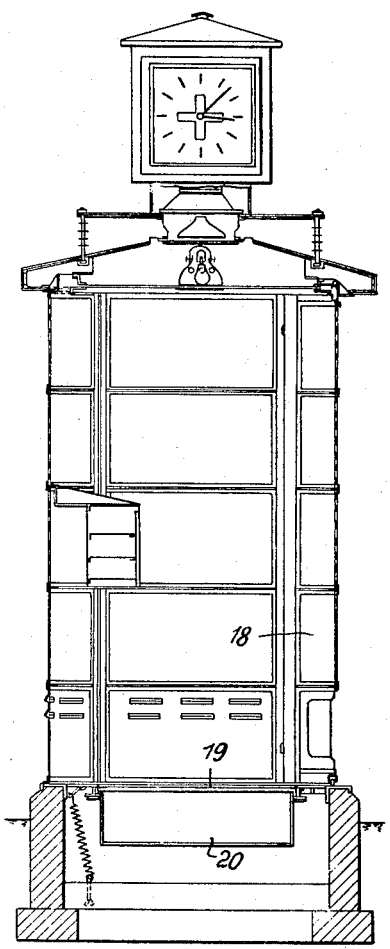

In the drawings:

Figure 1 is a side elevation of the stretcher when extended for use,

Figure 2 is a top plan view of the stretcher when extended with the body of the hood and the cover omitted, Figure 3 is a cross sectional view of the structure shown in Figure 2 taken through the intermediate frame thereof rearwardly of the traction wheels of the stretcher, Figure 4 is a view looking towards the rear end of the stretcher when folded, and Figure 5 is a front elevation partly in section of a street column.

The stretcher is in the form of a skeleton body part including an intermediate frame formed of spaced parallel tubular side members 1 connected together by spaced parallel cross bars 1ª, 1ᵇ, a rear frame formed of spaced parallel tubular side members 1ᶜ connected together by a transverse bar 1ᵈ and a front frame formed of spaced parallel side bars 10 connected together by a cross bar 29. The forward end terminal portions of the bars 10 are in the form of hand grips 10ª.

The intermediate or main frame of the stretcher has connected with the side members 1 thereof a pair of traction wheels 2 which are journaled in hangers 2ª of inverted U-form. Revolubly and slidably mounted on the forward portions of the members 1 are parallel sleeves 3, to the outer sides of which are secured the hangers 2ª. The members 1 and sleeves 3 have coacting inter-engageable clutching parts indicated at 5, 6 to provide a clutch, and when such parts are interengaged, the sleeves 3 are prevented from revolving with respect to the members 1. The manner of setting up the wheels 2 relative to the revoluble sleeves 3, permit of the wheels being folded inwardly to oppose the lower face of the intermediate frame when the stretcher is folded. The clutch provides a means for maintaining the wheels in active or inactive position. Associated with the sleeves 3 are controlling springs of a force tending to permanently clutch the sleeves to the members 1. These springs are indicated at 4 and they are mounted on the members 1 between the forward ends of the sleeves 3 and straps 17ª to be hereinafter referred to. The force of the springs 4 is such as to provide for the coaction of the parts 5, 6 to maintain the wheels in the position to which they have been set.

The members 1 are connected at their rear ends to the forward ends of the members 1c by the latchable hinge structures 16 whereby the members 1c may be folded to oppose the lower face of the members 1. Each structure 16 includes a forward part fixed to the rear end of each of the members 1 and a rear part fixed to the rear end of each of the members 1c. The parts of the structures 16 on the members 1 are hinged to the parts of the structures 16 on the members 1c. The latching means of each of the structures 16 consists of a combined cover and latching plate 21 which is pivoted to the rear part of a structure 16 and when in active position is to extend across the joint between the forward and rear parts of a structure 16 and detachably engage with the forward part. The plates 21 are notched for correlation with pins on the forward parts of the structures 16 to provide for detachably latching the hinged parts of the structures 16 together.

The members 1c intermediate their ends have hinged thereto supports 7 which constitute feet upon which the stretcher may rest when extended. The supports 7 are connected to the members 1c in a manner whereby they may be folded in a direction to oppose the outer sides of such members, when the stretcher is folded as shown in Figure 4.

Arranged in telescopic relation, as indicated at 14, with respect to the rear ends of the members 1c are extendible hand grips 13.

Hinged with the rear ends of the members 1c are handles 9 for pushing the stretcher when in extended position. The handles 9 will be again referred to hereinafter.

The bars 10 of the front or head frame are disposed in telescopic relation as indicated at 11 with respect to the forward ends of the members 1. Arranged over the front frame is a collapsible hood 8 which includes a plurality of U-shaped bows 8a hinged on the pivots 17 carried by the straps 17a secured to the bar 1a. The hood 8 is tightened by means of an extensible cover 8b which is connected at one end to a bow 8a and at the opposite end is connected to a collapsible bar 24 which is pivotally mounted on a strap 24a secured to the outer end of a frame member 1c. The bar 24 is held in vertical or upright position by means of a collapsible link structure including a pair of links 22 and 23. Each bar 1c carries a vertical bar 24 and these two bars are connected together by a transverse connecting bar 25.

Each handle 9 includes a pair of handle sections 9a and 9b with the handle section 9b pivotally secured at its lower end to the strap 24a and a connecting bar 9c connects the opposite ends of the handle sections 9b together. The handle section 9a may be collapsed as shown in the dot and dash lines in Figure 1 so that the stretcher may be carried by means of the hand grips 10a and 13.

The hood structure is held in extended position by means of a pair of notched bars 26 provided with notches 27 engaging a bar 29 which connects the two frame members 10 together. The two notched bars 26 are connected together at their lower ends by a connecting bar 28.

The hood 8 is collapsed in the direction of the arrow 18, and when collapsed it will appear as indicated at st1 Figure 4.

A hollow street column (Figure 5) has its body designated at 18. The column includes an intermediate bottom part 19, below which is arranged a chamber 20 of a size to receive the stretcher when the latter is folded.

I claim:

In a foldable stretcher, a stationary intermediate frame, a front frame disposed in telescopic relation with respect to the intermediate frame, a rear frame hinged to the intermediate frame, a collapsible hood disposed over said front frame, spaced parallel upstanding means fixed to the front of said intermediate frame for hinging said hood to such frame, a cover connected at its forward end to said hood disposed over said intermediate and rear frames, upstanding foldable braced means carried by the rear frame for connecting the rear end of the cover to the rear portion of said rear frame, and adjustable means carried by said hood selectively engageable at spaced points thereof with said front frame for varying the tension applied by the hood to the cover when the hood and cover are disposed in extended relation with respect to said frames.

HANS REICHERT.